Patented Jan. 28, 1930

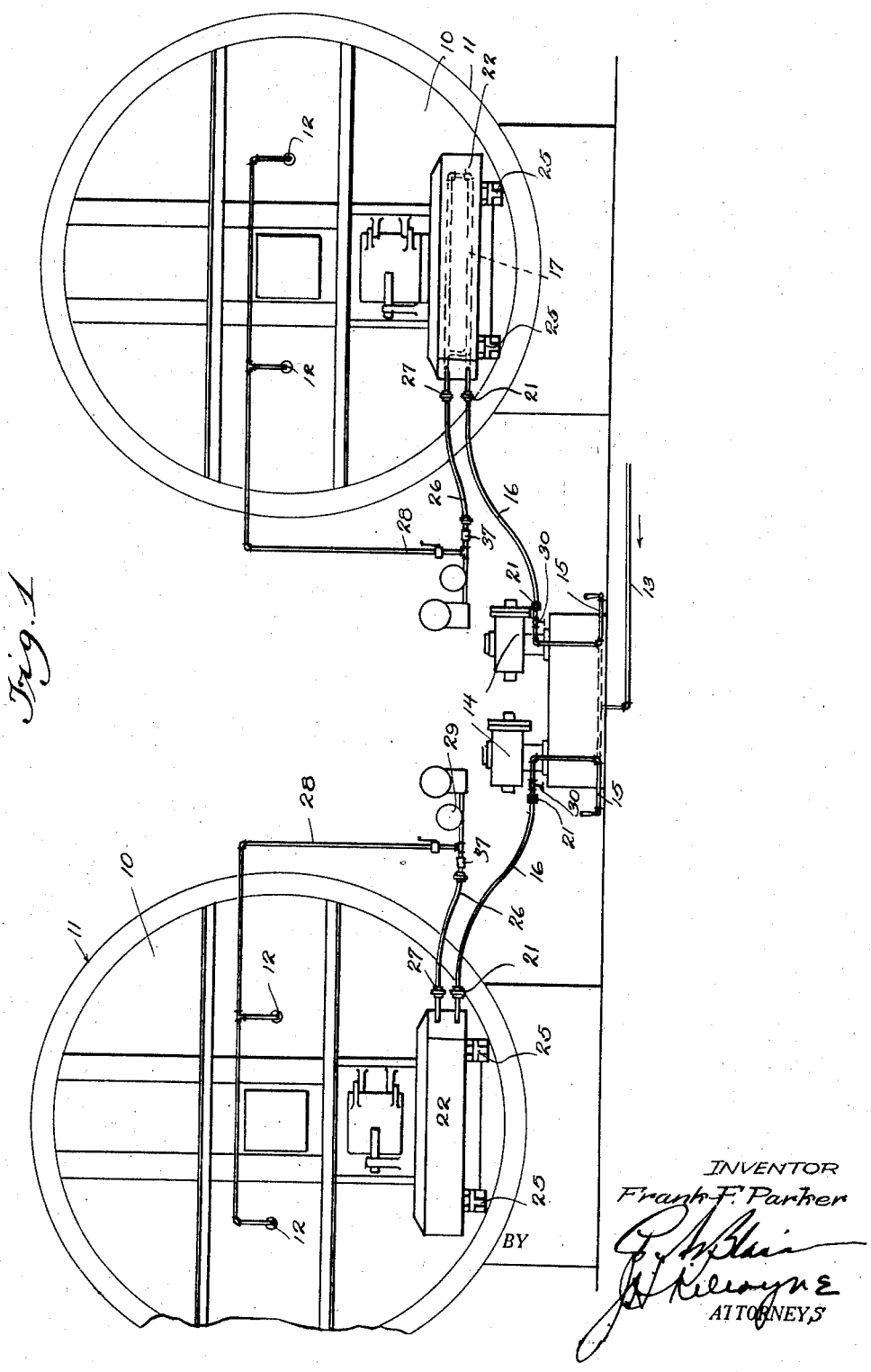

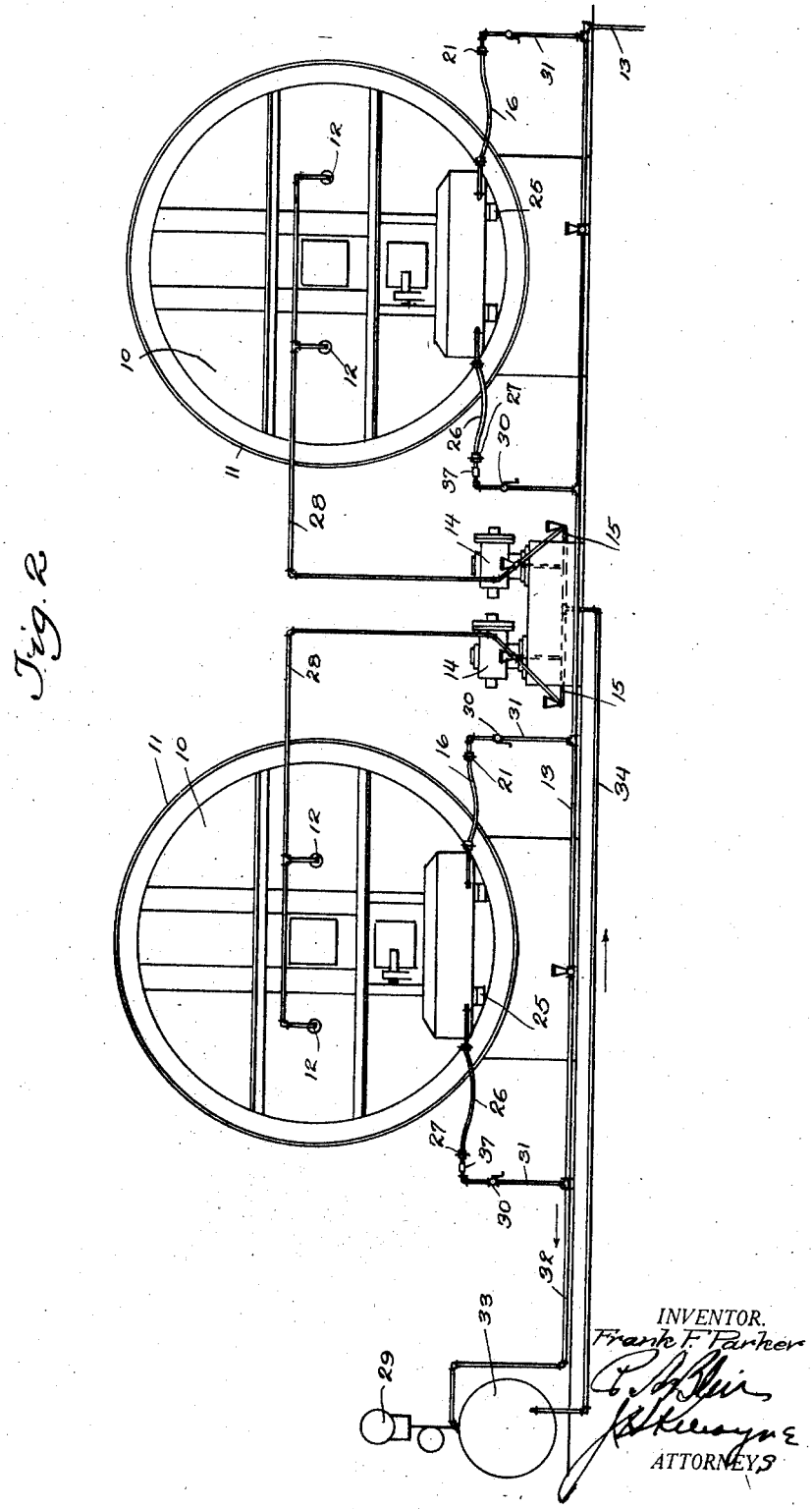

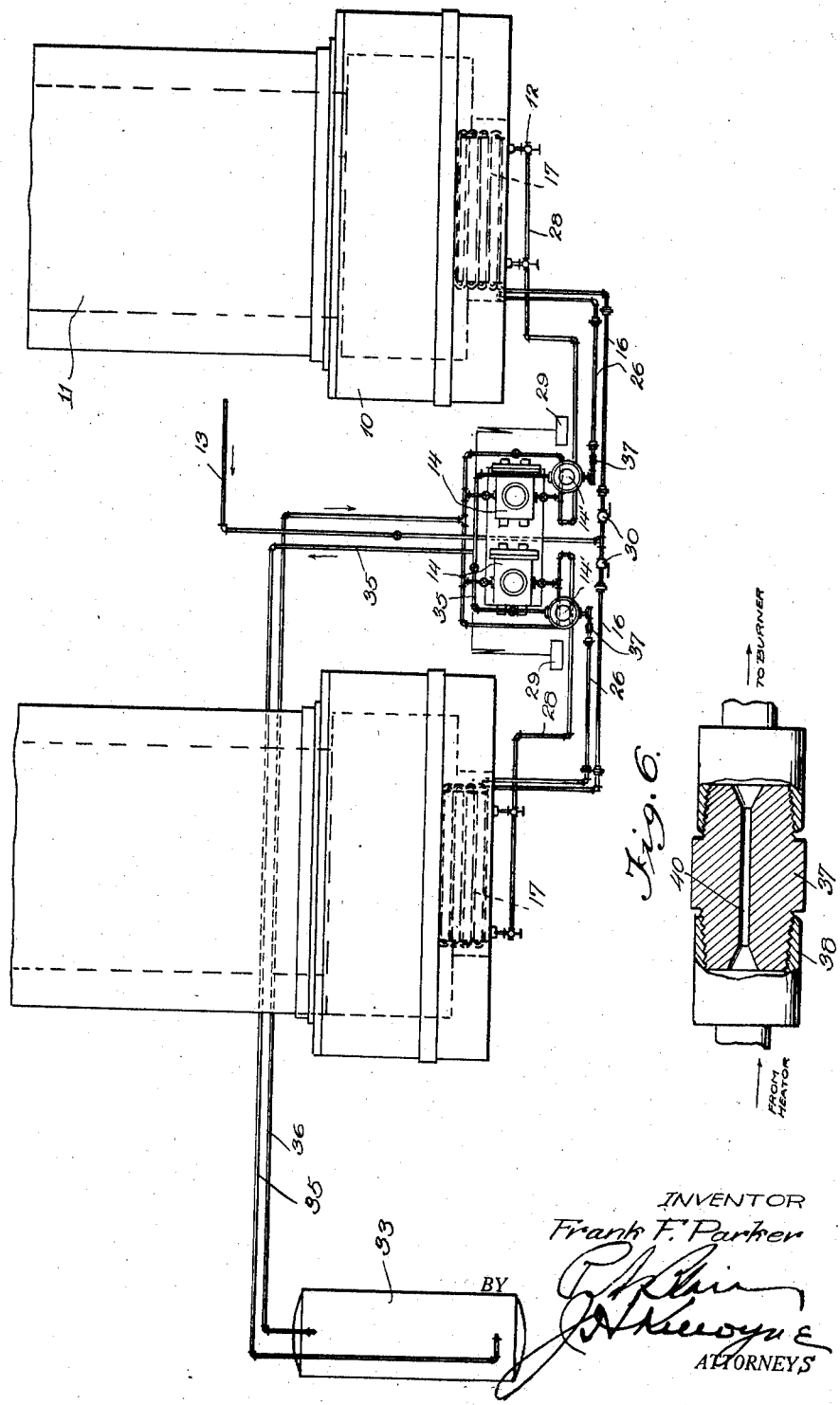

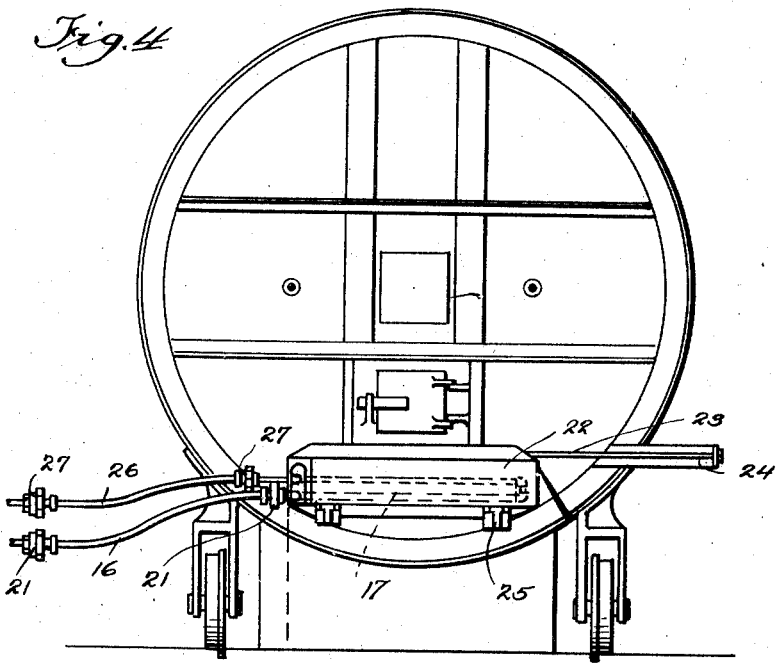
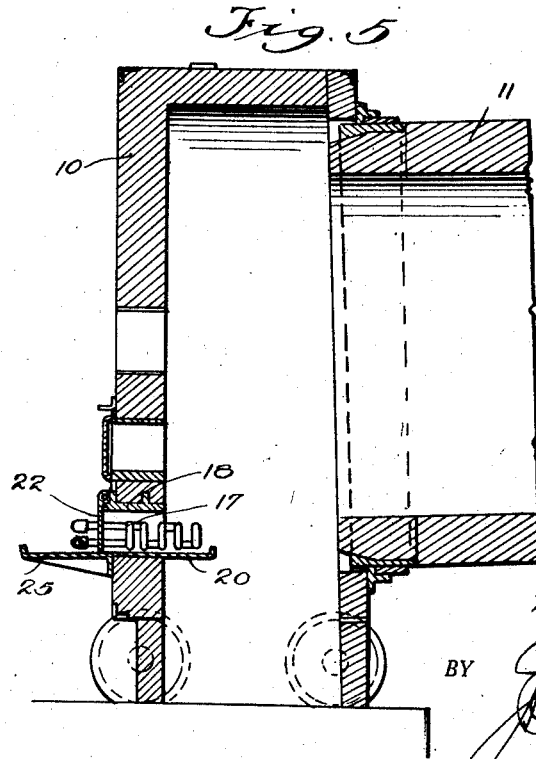

1,745,331

UNITED STATES PATENT OFFICE

FRANK F. PARKER, OF SAN JUAN BAUTISTA, CALIFORNIA

SYSTEM OF REGULATION AND CONTROL FOR LIQUID-FUEL-FIRED FURNACES AND THE LIKE

Application filed February 14, 1927. Serial No. 168,116.

The present invention relates to fuel heating systems for liquid fuel-fired furnaces, boilers, kilns, and the like, and to the regulation and control thereof, and to methods of fuel heating and of temperature regulation of the heated fuel.

In liquid fuel-fired installations, it is usual and necessary, in order to secure economical combustion and efficient atomization of the fuel, and to prevent the deposition of soot, to provide a heater which preheats the liquid fuel before its admission to the burners. The temperature to which the liquid fuel should be heated to give the most efficient or desired results varies with the different kinds of oil or equivalent fuel which is used for firing furnaces, boilers, kilns, and the like of the installation. Similarly, different types of furnaces, boilers, kilns and the like function best, by reason of their individual peculiarities or characteristics, when the oil or equivalent fuel is preheated to a certain temperature as distinguished from certain other types possessing distinct running characteristics and requiring different fuel temperatures to insure their most efficient and useful operation. It will thus be recognized that the temperature at which the fuel is to be delivered to the burners depends to a large degree upon the characteristics of the fuel and upon the particular furnace, boiler, kiln or the like being fired. An accurate control and regulation of the degree of heat to which the fuel is heated for the particular plant installation and for the kind of fuel to be fired is thus of great importance.

The quantity of fuel desired to be fed to the burners is a factor which also enters into the consideration of the fuel preheating temperatures. Since the quantity or volume of a heavy liquid fuel flowing at a given temperature and pressure thru a feed line of a given cross sectional area to a burner is less than the quantity of a lighter or thinner fuel which would flow under the same conditions, the same time element being present, it follows that the thinner or lighter fuel flows at an increased rate of flow and thus absorbs less heat in passing thru a heater. By reducing the size of the supply line, the rate of flow of the thinner fuel may be reduced, causing less fuel to flow thru the heater and resulting in a higher temperature of preheat being imparted to the fuel by reason of its slower flow thru the heater. There is thus present a relation between the temperature at which the fuel is to be preheated and the quantity of fuel flowing thru the heater as determined by the size of the fuel line from the heater or by an orifice inserted in the fuel line from the heater, which relation may be varied to meet the individual requirements of a particular installation or of a series of installations. It is a consequence that the control and regulation of such relation permits the degree of preheat to be controlled and similarly the quantity of fuel delivered by the heaters to the burners or fuel storage receivers whereby the most efficient and economical combustion may be effected with respect to the particular fuel available and in the particular furnace, boiler, kiln or the like to be fired.

It is therefore one of the primary objects of my invention to provide an improved system of fuel heating regulation and control for liquid fuel fired furnaces, boilers, kilns and the like, by which the temperature of preheat of the fuel to be fired may be controlled and regulated.

It is a further object of my invention to provide a simple, suitable and durable system of the above character in which the oil or equivalent fuel may be heated to a temperature which permits the most efficient functioning of the particular furnace, boiler, kiln or other type of fire box to be fired.

It is a further object of my invention to provide a readily controlled system of the above described character in which oil or equivalent fuel having varying characteristics may be heated to a temperature which insures its most economical combustion in the particular type of fire box being fired.

A further object is to provide a system of regulation and control of the quantity of oil or equivalent fuel delivered from a heater to the furnace, boiler, kiln or the like for the purpose of firing the same.

A further object is to provide a system of regulation and control of liquid fuel fired plants or units thereof whereby the oil or equivalent fuel to be fired is brought to its most efficient temperature of preheat for firing, in the particular unit or units, which system controls and regulates the relation between the desired temperature of the oil or equivalent fuel and the quantity thereof to be delivered to the furnace, boiler, kiln or the like.

A further object of my invention is to provide a heater for the heating of oil for fuel purposes which is subjected to the direct heat or to the heat of radiation or convection or both of a liquid fuel burning furnace, boiler, kiln or the like.

A further object is to provide a heater for oil or equivalent fuel for the purpose of firing furnaces, boilers, kilns or the like of the last above named character which permits of the control and regulation of the temperature to which said oil or equivalent fuel is heated.

Further objects of my invention are to provide an improved method of regulation and control of the temperature of heated oil or equivalent fuel for fuel purposes in firing furnaces, boilers, kilns and the like; to provide an improved method of regulation and control of the quantity of oil or equivalent fuel delivered to the burners or fuel storage receivers of liquid fuel-fired furnaces, boilers, kilns and the like; and to provide a method of regulation and control of the relation between the heating of the oil or equivalent fuel and the quantity thereof to be delivered to the burners or fuel storage receivers of liquid fuel-fired furnaces, boilers, kilns and the like to insure a desired temperature and quantity of oil or equivalent fuel considered or found out to be most efficient with reference to a particular furnace, boiler, kiln or the like, or furnaces, boilers, kilns or the like, and the particular kind of oil or equivalent fuel which is used for firing in connection therewith.

Other objects will be in part obvious and in part hereinafter brought out in the accompanying specification.

According to the present invention, there is provided a liquid fuel heater installed inside of a fire box or in the fire box wall of furnaces, boilers, kilns and the like, or in the hoods and combustion chambers of rotary kilns, so that the heater is subjected to the direct heat resulting from the combustion of the liquid fuel, which will hereinafter be termed "oil", within the furnace, boiler, kiln or the like, or the heat of radiation or convection, or both, resulting therefrom. As the oil passes thru the heater, it is brought to an approximate temperature before being delivered directly or indirectly to the burner. The heater is movable toward and away from the heat zone to permit of a control and regulation of the temperature of the oil therethru. The present invention also provides for an orifice of predetermined cross sectional area to be positioned in the oil line on the discharge side of the heater to control the rate of flow of the oil thru the heater. By means of this orifice, a control of the flow and the quantity of oil thru the heater is determined. By moving the heater, which may be made up of a unit or units and which is attached to the oil supply line by flexible connection and ball and socket joints, toward or away from the heat zone of the furnace, boiler, kiln or the like, an accurate control and regulation of the temperature of the oil of a desired quantity as determined by the orifice passing from the heater to the burners or fuel storage receiver is made possible.

The general arrangement of the system of regulation and control in accordance with the above noted and other objects is shown in the accompanying drawings in which—

Fig. 1 is a schematic diagram in front elevation of my improved fuel heating regulation and control system applied to a rotary kiln or kilns fired with oil.

Fig. 2 is a view similar to Fig. 1 showing a modified arrangement.

Fig. 3 is a schematic diagram in plan of a further arrangement of the fuel system.

Fig. 4 is a kiln hood or combustion chamber in front elevation having a liquid fuel heater in accordance with my invention incorporated therewith.

Fig. 5 is a longitudinal section of a kiln and kiln hood or combustion chamber showing the heater as shown in Fig. 4.

Fig. 6 is a detail in section of a flow regulating orifice in the oil line to the burner.

Referring to Fig. 1, the reference character 10 designates a hood or combustion box of a rotary kiln 11, the said kiln being typical of any furnace or boiler having a fire box adapted to be fired by liquid fuel, such as oil. The system of oil admission to burners 12, which are fired through the front wall of hood 10, comprises a supply line 13 from a reservoir (not shown) which delivers oil at a suitable line pressure thru the usual metering device 14, about which the oil may be by-passed as indicated at 15. The oil then flows thru a flexible metal hose 16 and is delivered to a heater 17 which, by reference to Figs. 4 and 5, is mounted thru an opening or recess 18, in the front wall of the hood 10, and which rests upon a support 20 extending for a distance into said hood. Ball and socket flexible joints 21 between the hose 16 and the pipe line and heater permit ready connection between these parts. The recess or opening 18 is closed by a door 22, mounted from shaft 23 in bushing 24 on hood 10.

On the front side of the hood and adjacent the support 20 for the heater 17, brackets 25 extend in spaced relation for a purpose hereinafter to be described. The oil passes thru the heater and thence thru a flexible hose 26, having ball and socket flexible joints 27 with said heater and with a pipe line 28, delivering to burners 12.

The oil line is suitably valved in the usual manner adjacent the metering device 14 and throughout its by-pass 15. I also provide between the heater 17 and the oil supply a quick acting valve or gate 30 which may be operated automatically or may be hand controlled, whereby, in case of a leak or accident to the heater or other part of the oil line, the supply of oil may be immediately shut off. When an automatic valve is used, the supply of oil from the reservoir is instantly cut off as soon as any leak occurs. Where a hand controlled quick acting valve or gate is used, the same must be manually thrown to shut off the supply of oil, but, in either case, it is possible, in case of accident to or defect in the system or heater, to cut off the supply of oil immediately. Similarly for further protection, if desired, additional automatic or manual quick acting valves or gates may be installed at other points in the system.

The heater 17 as above described preferably is of the coil type which may be made in any desired shape or size, and of a desired number of units, suitable to be fitted into a kiln hood or fire box. It will be understood that any type of heater suitable to meet the requirements of use is equally applicable in place of the said coil heater. By reason of the mounting of the heating coil on its support 20, the said coil may be moved toward or away from the heat zone of the combustion chamber or hood whereby the amount of heat to which the coils are subjected may be readily varied. To determine the temperature of the heated oil or equivalent fuel, I provide between the heater 17 and burners 12 a recording thermometer 29. The movement of the heater 17 may be effected by manual, mechanical, or automatic means, and it is also intended to automatically control the same as by a thermostat.

In case of a shut down, the coil 17 is pulled out thru the opened door 18 and rests on brackets 25 to prevent the carbonizing of the oil in the interior of the heating coil. The provision of the flexible metallic hose 16 and 26 and the ball and socket flexible joints 21 and 27 between the heater 17 and the pipe line permits movement of the coil toward or away from the heat zone of the oil being fired. If it is desired to apply more heat to the coil 17 as determined by the heat of the oil as recorded by the thermometer 29, the said coil may be pushed forward closer to the flame. If less heat is desired, the unit may be pushed back into its recess 18 so that it will receive a lesser amount of heat. The oil is thus heated in coils subjected to the direct heat of the flame from the burners 12 or by the heat of radiation or convection or both resulting therefrom. The system as disclosed with reference to Fig. 1 is applied to a single control unit; that is, the oil or equivalent fuel heated by each of the coils 17 of both kilns 11, or any number thereof, is fed directly to the burner nozzles of the kiln in which the oil has been heated. This system has been shown here in its application to a rotary kiln, but it will be understood that any heater such as coil 17 may be installed inside the fire box, in the fire box wall or in the hood or combustion chamber of any type of furnace, boiler, kiln or the like, adapted to be fired by liquid fuel and operated to heat the oil or equivalent fuel used for firing and to control the temperature thereof with equal facility.

By reference to Fig. 2 there is provided a system of control and regulation in which oil from cold storage is run thru more than one heater into a single feed pipe which discharges into a supply tank from which the oil is delivered to the burners, the oil being superheated or brought above its firing temperature. For the purpose of a clear understanding, there is shown a battery of two rotary kilns 11, each of which is provided with oil heaters 17 in the hoods 10 thereof. Oil under pressure from a reservoir (not shown) is fed thru a common feed line 13 to each of the heating coils 17, thru pipes 31 and flexible metal hose 16, as will be understood from Figs. 1, 4 and 5. The heated oil passes from the coils 17, thru the flexible hose 26 to a common line 32 into a receiver 33. From said receiver, the heated oil returns thru line 34 and the usual metering devices 14 about which it may be by-passed as at 15, and is delivered thru lines 28 to burners 12, firing the units 11 of the battery. Valves or gates 30 are provided and a recording thermometer 29 is positioned in the oil line 32 adjacent the receiver 33. The temperature of the heated oil is controlled by moving the coils toward or away from the heat zone of the kilns 11, in accordance with the above description.

Altho only two units are herein shown, it will be understood that a battery of any number of kilns may be arranged to receive heated fuel from the required number of heaters positioned in the units of the battery. Sufficient oil can be heated in one of the coils 17 to provide heated fuel for a larger number of units.

In operating a battery of larger number of furnaces, boilers, kilns and the like from one or more heaters 17, it is desirable to heat the oil to a slightly higher temperature than would be the case wherein the oil is heated by a heater 17 positioned in the particular furnace, boiler, kiln or the like being fired, in order to take care of certain temperature looses which are bound to occur by reason of lengthy pipe lines and cooling of the oil in the reservoir.

Considering the system as shown in Fig. 3, oil from cold storage is heated in more than one heater, and the heated oil is run to storage tanks or reservoirs wherein a reserve of heated oil may be stored. In this form of the system which is applied to a battery of two kilns 11, the oil is supplied under pressure to the feed line 13, from whence it passes thru heaters 17 mounted as shown in Figs. 4 and 5, in each of the battery units 11, which heaters have flexible hose connections 16 and 26 with the oil line, and thru flow regulating meters 14', and is delivered thru line 35 to the storage tank or receiver 33 from whence it is delivered thru line 36, measuring meters 14 and line 28 to burners 12. The line is provided with a quick acting valve or gate 30, operable upon defect or accident to the heater or system. Temperature control is effected by reason of the mounting of the heaters 17 in movable relation to the heat zone of the oil being fired, and the temperature is determined by the thermometers 29.

The above described systems in addition to the valves or gates 30 and the flexible mounting of the heaters 17 have the added control of the quantity of oil delivered to the burners. This latter control is obtained by inserting an orifice member or regulating plug 37 (Fig. 6) in the oil line on the discharge side of the heaters 17, having an orifice therein of such size as to pass a required quantity of oil thru the burners 12 for firing. The said orifice member 37 is placed in the line so that it may readily be insertable therein and easily removable therefrom as by unions 38. Where a required quantity of oil of known fluidity is required by the burners to obtain the highest efficiency of the furnace, boiler, kiln or the like being fired, an orifice member 37 having an orifice 40 therein of a size to pass the required quantity thereof is selected. The orifice member may be made of metal, wood, paper or glass composition, or any other suitable material and may vary in length from the thickness of a disc to several inches or more with a cross sectional shape of any required form.

The provision in the oil line of an insertable orifice member 37, of a size to deliver to the burners that quantity of oil which insures the most efficient functioning of the furnace, boiler, kiln or the like to be fired, the quantity being dependent upon the individual characteristics of the furnace, boiler, kiln or the like and upon the kind of oil to be used, makes possible an accurate control of the quantity of oil so delivered. As the rate of flow and thus the quantity of oil fed thru the orifice from the heater may vary according to the kind of oil used (that is, a heavy oil flows at a reduced rate of flow as distinguished from the flow of a lighter oil, all other conditions being equal) the heat absorbed by the oil as its passes thru the heater may be said to vary inversely as the rate of flow of the oil or equivalent fuel. There thus appears a relation between the quantity and temperature of the oil or equivalent fuel to be delivered to the burners for fuel purposes, the control and regulation of which may be effected, in accordance with my invention, to obtain a desired exact temperature and quantity of the oil in the following manner.

The systems as shown in Figs. 1, 2 and 3 are operated broadly in the same manner. The fluidity or degree of thickness of the oil available for use being known and the line pressure applied thereto being established, the size of an orifice 40 on the discharge side of the heaters 17, which will pass the desired quantity of oil to the burners, may be determined and the selected orifice member 37 placed in the line. The oil is heated to approximately the temperature at which it is desired to use it by running it thru the heaters 17. To obtain an exact temperature required in the system shown in Fig. 1, the heaters 17 are advanced near to or removed from the flame within the fire box to control the heat applied thereto, which movement is permitted by reason of the flexible connections of the heaters with the supply line. Where a larger number of furnaces, boilers, kilns and the like are operating and it is desired to heat all of the oil or equivalent fuel in one furnace and in a single heater unit therein, the oil or equivalent fuel after passing thru the single heater unit 17 and orifice member 37 will be at the temperature desired for firing and will be fed thru different lines to different furnaces, boilers, kilns and the like. In the arrangement shown in Figs. 2 and 3, where it is not desired to use the hot oil or equivalent hot fuel immediately, the same may be stored in the fuel storage receiver until required or fed from this receiver 33 to the various furnaces, boilers, kilns or the like to be fired. In this latter instance, it is generally desirable to heat the oil or equivalent fuel to a higher temperature than that at which it is to be fired to allow for a temperature drop of the oil or equivalent fuel held in the hot fuel storage reservoir 33 and then passed thru the line to the respective burners. If the installation is a large one, as for instance, an installation where fifty furnaces, boilers, kilns or the like of the battery would furnish a supply of hot oil or equivalent fuel sufficient to fire the entire battery.

It will be understood that any wear occurring in the orifice 40 by reason of continued flow of the oil therethru for long periods of time and resulting in enlargement of the orifice and in the oil being delivered to the burners at a temperature lower than desired may be corrected by slightly advancing the heater 17 into the heat zone.

The heater, and system and method of heating oil or equivalent fuel for firing purposes has been described above with particular reference to a rotary kiln or kilns, but is adapted to be placed in the interior of fire boxes, combustion chambers and the like of any type of oil burning furnace, boiler, kiln or the like and the liquid fuel to be therein heated by the direct heat of combustion, or by the heat of radiation and convection or both resulting therefrom. Firing of extra boilers for oil or equivalent fuel heating purposes is thus made unnecessary by my invention as described above. For instance, in liquid fuel burning cement plants where the industry requires no generation of steam, it is usual to fire a steam boiler to generate steam for heating the oil or equivalent fuel which is subsequently fired at the burners of the kilns. The method and system of fuel heating regulation and control as above described, being operative to heat the oil or equivalent fuel in the combustion box or hoods of one or more of the rotary kilns, eliminates the necessity and expense of providing a separate furnace for fuel heating purposes. In other industries, the type of heater and its form of connection with the oil line as herein disclosed has ready application and utility.

By reason of its movable relation to the heat zone of the fire box in which it is positioned, the heater unit further provides an improved control of the temperature of the fuel. This control and the relation established between the temperature and the quantity of oil or equivalent fuel to be delivered to the burners provides a method of and system for regulation and control of the temperature and quantity of the oil or equivalent fuel required to obtain the most efficient functioning of the particular furnace, boiler, kiln or the like or furnaces, boilers, kilns or the like being fired and of the particular oil or equivalent fuel available.

It will be seen that the several objects of the invention are achieved and other advantageous results attained. As many changes could be made in carrying out the above construction, without departing from the scope of the invention, it is intended that all matter contained in the above description or shown in the accompanying drawings shall be interpreted as illustrative and not in a limiting sense.

I claim:

1. In a system for heating liquid fuel to be delivered to the burners of liquid fuel fired furnaces, kilns or the like, the combination of a fuel supply line delivering oil to the burners, and a fuel heater element in said supply line extending into said furnace or kiln and adapted to be heated by its proximity to the heat zone of the fuel being fired from said burners and mounted for movement toward and away from the heat zone thereof.

2. In a system of regulation and control of the temperature of the liquid fuel delivered to the burners of liquid fuel fired furnaces, kilns or the like, the combination of a fuel supply line delivering oil to the burners, and a fuel heater element in said supply line adapted to be heated by its proximity to the heat zone of the fuel being fired from said burners, the fuel heater element having a flexible connection with the feed line whereby it is movable with respect thereto.

3. In a system of regulation and control of the temperature and quantity of the fuel delivered to the burners of liquid fuel fired furnaces, kilns or the like, the combination of a liquid fuel supply line delivering fuel under pressure to the burners, means heated by its proximity to the heat zone of the fuel being fired from said burners and positioned in the supply line, whereby the fuel passing therethru is heated, and a flow regulating plug in said line having an orifice therein of a size to pass a desired quantity of the heated fuel of a determined fluidity and at the line pressure to the burners.

4. In a liquid fuel fired kiln or the like in which the fuel is heated before delivery to the fuel burners, the combination of a kiln hood having a recess in the front wall thereof, a fuel supply line delivering fuel to the burners, and a fuel heater having a flexible connection with the supply line, said heater extending in said recess and being mounted therein for movement toward and away from the heat zone of the fuel fired from the burners.

5. In a liquid fuel fired kiln or the like in which the fuel is heated before delivery to the burners, the combination of a fuel supply line delivering fuel to the burners, a fuel heater mounted in a recess formed in the front wall of the hood being fired and having a flexible communication with the fuel supply line, the said heater being mounted for movement toward and away from the heat zone of the fuel fired from the burners, and an orifice member in said line having an orifice therein of a size to deliver to the burners a desired quantity of the heated fuel of a determined fluidity and at the line pressure.

6. In a liquid fuel fired kiln in which the fuel is heated before delivery to the fuel burners, the combination of a kiln hood having a recess in the front wall thereof, a support disposed in said recess and extending into the hood, a supply line delivering the fuel to the burners, and a fuel heater having a flexible connection with the supply line and mounted on said support for movement toward and away from the heat zone of the fuel being fired.

7. In a liquid fuel fired kiln in which the fuel is heated before delivery to the fuel burners, the combination of a kiln hood having a recess in the front wall thereof, a support disposed in said recess and extending into the hood, a supply line delivering the fuel to the burners, a fuel heater having a flexible connection with the supply line and mounted on said support for movement toward and away from the heat zone of the fuel being fired from said burners, and a support exterior of said hood and adjacent the recess, the heater being removable from the hood thru said recess on to said last named support.

8. In a liquid fuel fired kln in which the fuel is heated before delivery to the fuel burners, the combination of a kiln hood having a recess in the front wall thereof, a support disposed in said recess and extending into the hood, a closure operative to close said recess, a support exterior of the hood and adjacent said recess, a supply line delivering fuel to the burners, and a fuel heater flexibly connected with the supply line and mounted on said first named support for movement toward and away from the heat zone of the fuel being fired, and removable from the hood on to the last named support upon opening of said closure.

Signed at San Juan Bautista, this 12th day of January, 1927.

FRANK F. PARKER.